Oct. 13, 1959 G. D. ROBAR 2,908,319

PLATE MOUNTING DEVICE

Filed Oct. 8, 1956 4 Sheets-Sheet 1

Inventor
Garret D. Robar by Hill, Sherman, Meroni, Gross & Simpson Attys.

Oct. 13, 1959 G. D. ROBAR 2,908,319

PLATE MOUNTING DEVICE

Filed Oct. 8, 1956 4 Sheets-Sheet 2

Inventor
GARRET D. ROBAR by Hill, Sherman, Meroni, Gross & Simpson Attys.

Oct. 13, 1959 G. D. ROBAR 2,908,319

PLATE MOUNTING DEVICE

Filed Oct. 8, 1956 4 Sheets-Sheet 3

Inventor
Garret D. Robar by Hill, Sherman, Meroni, Gross & Simpson Attys.

Oct. 13, 1959 G. D. ROBAR 2,908,319

PLATE MOUNTING DEVICE

Filed Oct. 8, 1956 4 Sheets-Sheet 4

Inventor
Garret D. Robar by Hill, Sherman, Meroni, Gross & Simpson Attys.

United States Patent Office 2,908,319
Patented Oct. 13, 1959

2,908,319

PLATE MOUNTING DEVICE

Garret D. Robar, Northbrook, Ill., assignor to Vandercook & Sons, Inc., Chicago, Ill., a corporation of Delaware Application October 8, 1956, Serial No. 614,550

3 Claims. (Cl. 154—1)

The present invention is directed to an assembly for applying uniformly a predetermined pressure load to a surface and has particular applicability to the securing of printing plates onto a support surface.

Up until recent times, the usual manner of securing a printing plate such as a halftone or an electrotype to a supporting base was to mount the printing plate on a wooden block by means of nails. It frequently occurred that the wooden blocks would become warped or dimensionally inaccurate in some other way with the result that they did not have sufficient strength in compression for the printing or molding operation which followed.

Recently, a new development has been achieved which promises to overcome the defects associated with wooden mounting blocks. In this new development, the plate to be mounted is secured to a base of type metal which is suitably cored to eliminate a substantial amount of the weight of the metal without loss in compressive strength. In order to secure adequate adhesion between the printing plate and the type metal base, the usual practice is to provide a bonding film of a synthetic resin or the like between the plate and the upper surface of the base and to laminate the plate to the base by the application of suitable heat and pressure.

The present invention is concerned primarily with an assembly suitable for carrying out such a laminating operation. It provides a press assembly in which uniform pressures can be applied over a wide area in a convenient manner, and also contains provision for heating a superimposed type metal base, a plastic film, and a printing plate to be mounted.

Accordingly, an object of the present invention is to provide an improved pressure assembly particularly suited for securing a printing plate to a metal base.

Another object of the present invention is to provide a press capable of applying predetermined pressures uniformly along extended areas.

A further object of the present invention is to provide an easily operable press assembly having a self-locking feature for mounting printing plates to metal bases.

Other objects and features of the present invention will be apparent to those skilled in the art from the following description of the attached sheets of drawings which illustrate a preferred embodiment of the invention.

Figure 1:
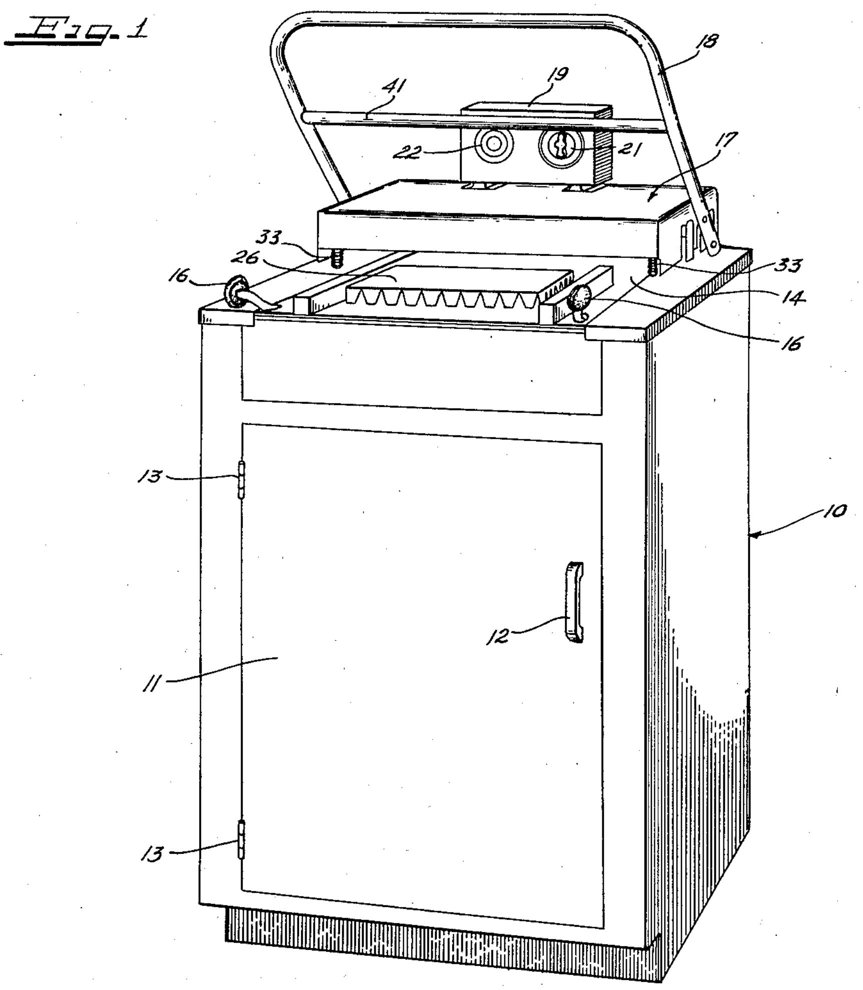
Figure 1 is a view in perspective of a press embodying the principles of the present invention.

In Figure 1 reference numeral 10 indicates generally a stationary frame assembly which serves as the main support for the press. The frame 10 may include a door 11 provided with a handle 12 and hinges 13, the door 11 providing access to shelves or the like in the interior of the press for storing printing plates or mounting bases.

A supporting table 14 is slidably received within the frame 10 through the use of channels or the like (not shown) and a pair of handles 16 are provided on opposite sides of the table 14 to permit easy sliding movement of the table 14 at the upper part of the frame 10.

The press assembly also includes a movable platen generally indicated at 17 which is movable into pressure applying relationship with the articles located on the supporting table 14. A manually operated handle 18 is provided to move the platen 17 into and out of pressure applying relationship with such articles. A housing 19 is provided on the platen 17 and serves to support an automatic timer mechanism 21 and a manually adjustable thermostat 22 to permit application of the proper temperature for the required time during the bonding of the printing plate to the base.

Figure 2:
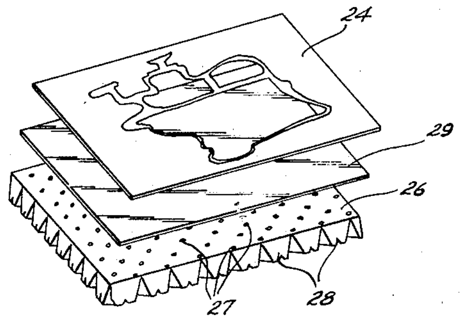
Figure 2 is an exploded view in perspective of the three components making up the complete printing plate assembly.

The assembly to be bonded is best illustrated in Figure 2 of the drawings. In that figure, reference numeral 24 designates a printing plate to be bonded, and reference numeral 26 is applied to a base composed of type metal or the like. The base 26 is provided with spaced apertures 27 and is also cut away to provide generally pyramid shaped cores 28, the removal of metal from these areas being sufficient to eliminate about one-half of the weight of the metal without causing a substantial loss in compression strength. The apertures 27 serve the additional purposes of providing an outlet for gases which may accumulate during laminating and also provide gripping areas for stronger adhesion.

Disposed intermediate the printing plate 24 and the base 26 is a film 29 composed of a synthetic resin which may be a thermoplastic resin such as a vinyl polymer. The natural adhesiveness of the film 29 which results from heating the film to a suitable temperature on the order of 300° F. provides the bonding action between the printing plate 24 and the base 26.

Figure 3:
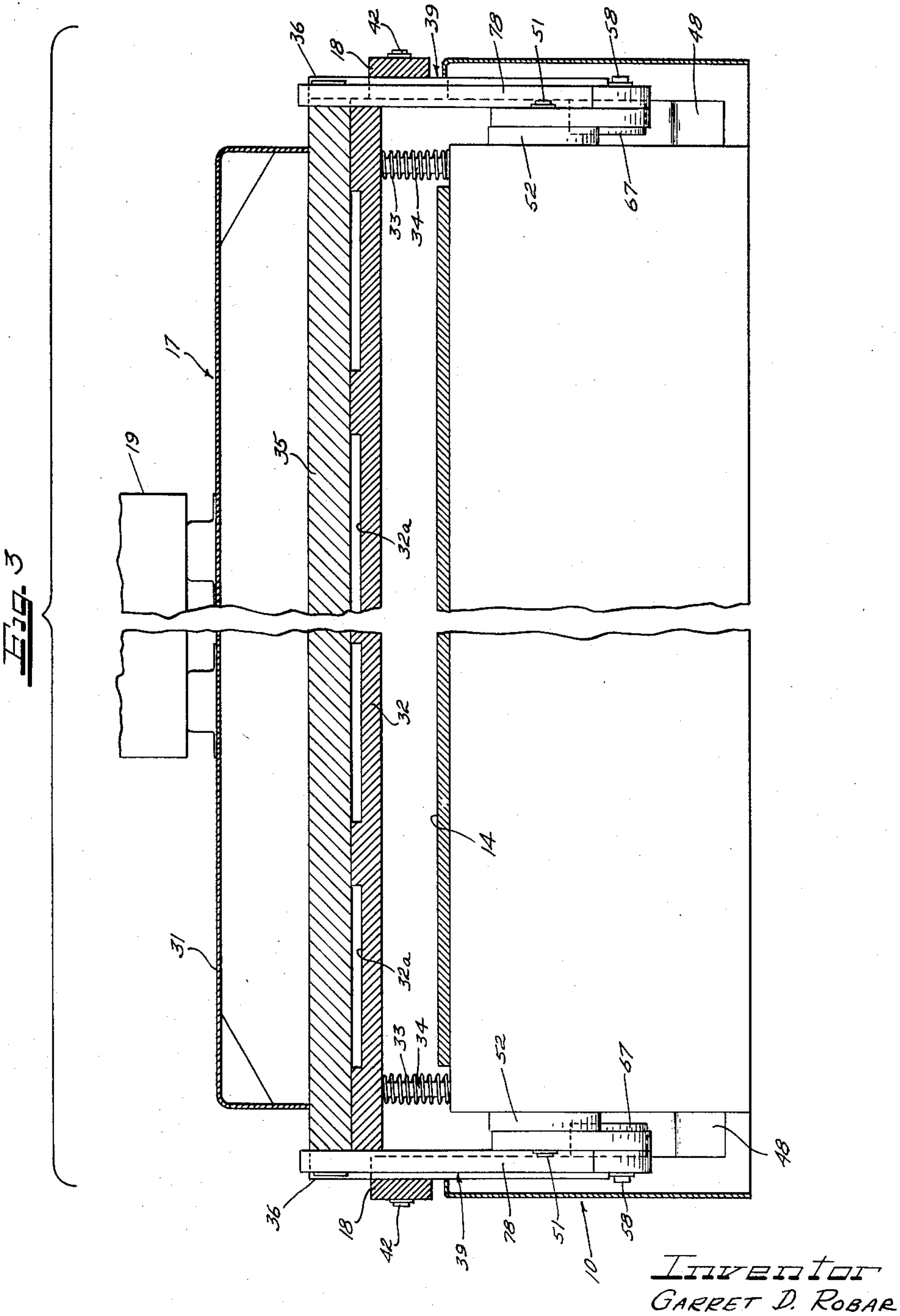
Figure 3 is a view partly in elevation and partly in cross section illustrating the control mechanism.
Figure 4:
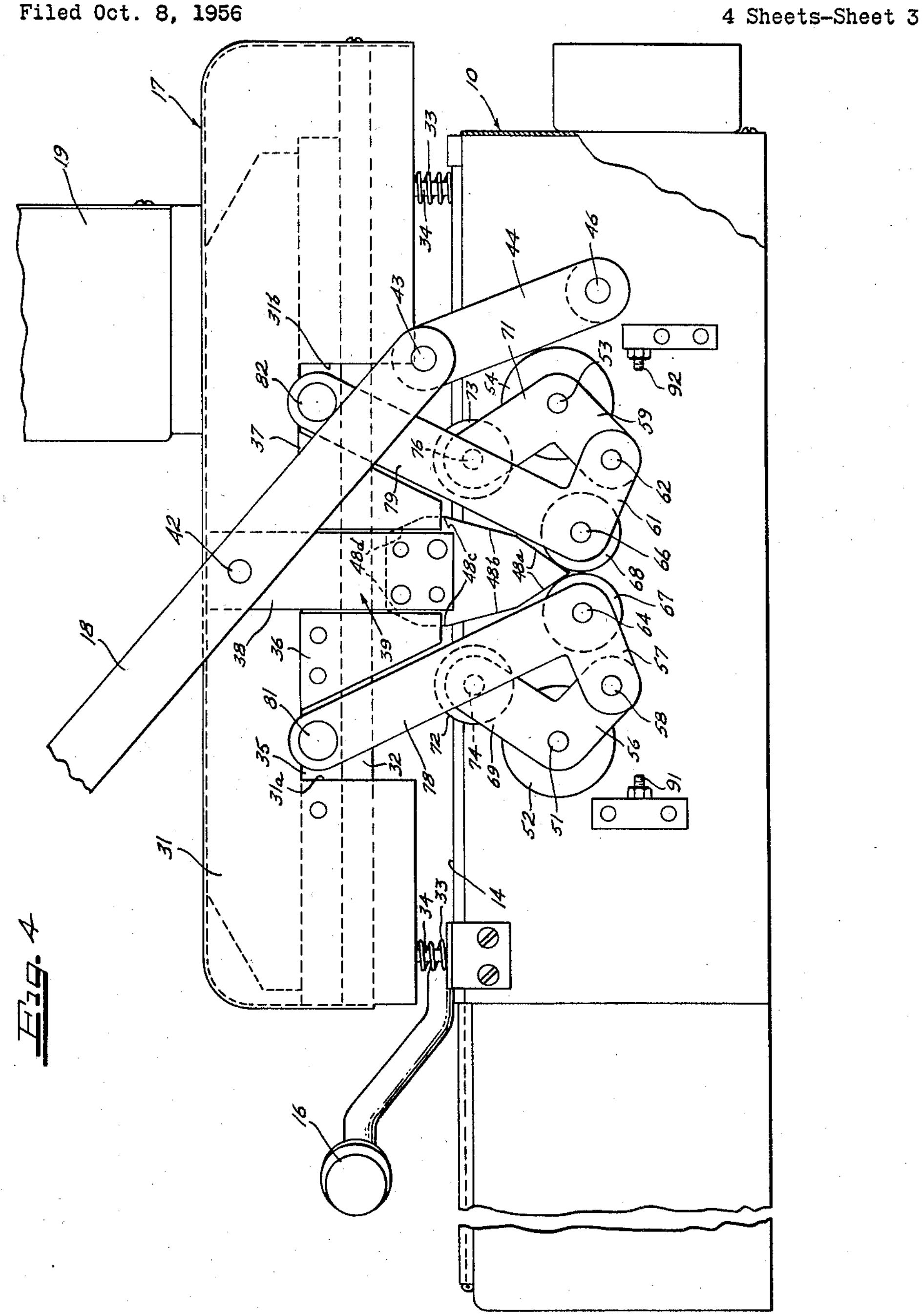
Figure 4 is an elevational view, partly broken away, illustrating the wedge cam arrangement for the assembly, the parts being in the raised or inoperative positions.
Figure 5:
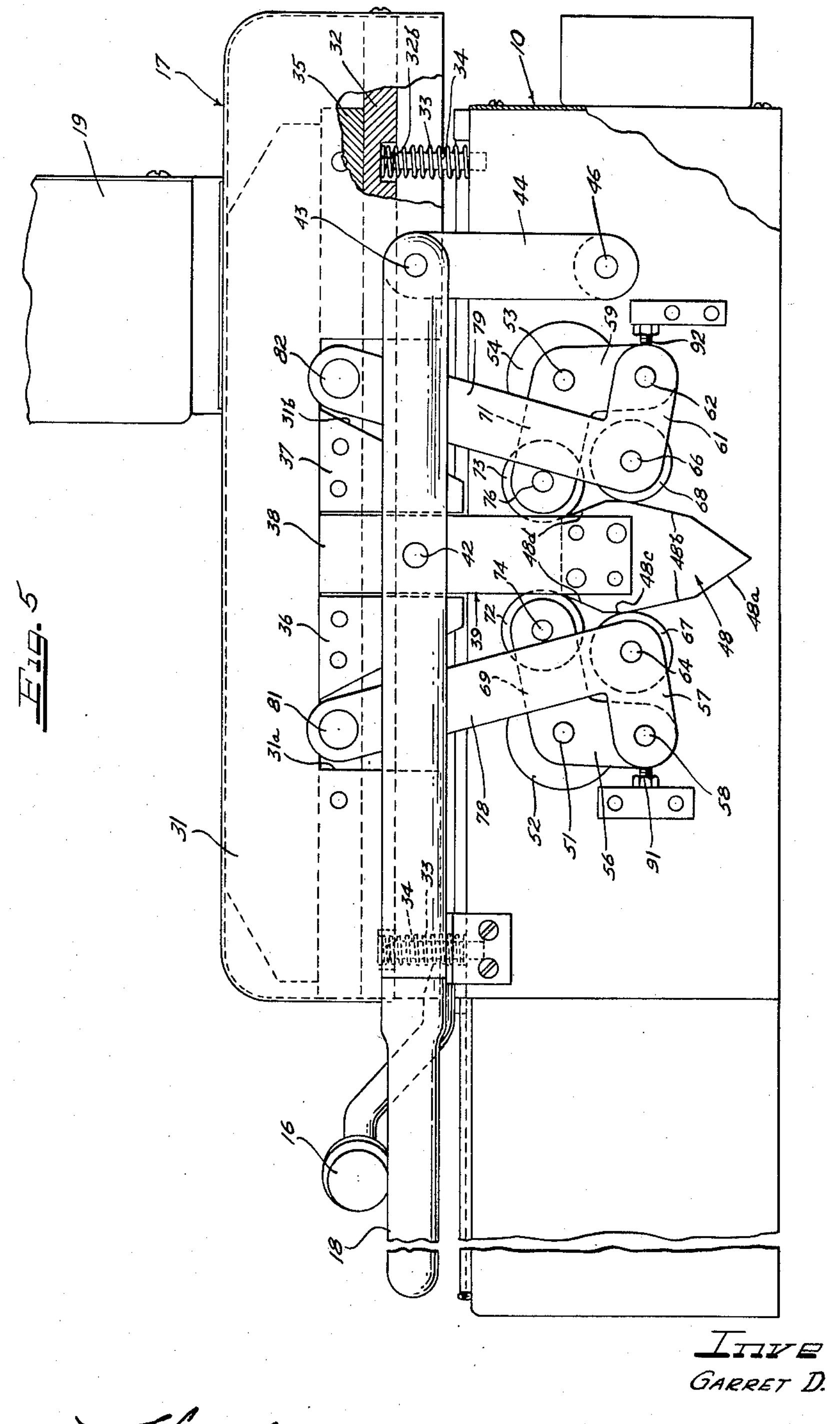
Figure 5 is a view similar to Figure 4 that illustrates the pressure applying mechanism during the time the assembly is applying pressure to the printing plate and base.

As best illustrated in Figures 3 through 5 of the drawings, the platen 17 includes a shroud 31 composed of sheet metal or the like. The shroud 31 serves as a cover for a frame assembly including a pair of flat plates 32 and 35 in superposed relation. The lower plate 32 contains recesses 32*a* (Figure 3) arranged to receive electrical heating elements whose energization time and temperature are controlled by the timer 21 and the thermostat 22 respectively. The heating elements may be embedded in a fill of an insulating material such as asbestos wool.

The entire platen assembly 17 is supported in normally spaced relation from the supporting table 14 by the provision of a plurality of springs 33 disposed at the four corners of the lower pressure plate 32. As best illustrated in Figure 5, each of the springs 33 is received about a pin 34 which has one end fixedly secured to a stationary part of the frame 10. As also evident from Figure 5, the pressure plate 32 is relieved as indicated at 32*b* to accommodate the free upper ends of the springs 33.

A pair of opposed angularly shaped guides 36 and 37 are suitably secured to the pressure plate 32 to provide a guideway for the shank 38 of a wedge cam assembly generally indicated at numeral 39 in the drawings. The purpose of the guides 36 and 37 is to assure that the movement of the cam 39 will be in a strictly vertical path.

As is evident from an inspection of Figure 3, identical cam assemblies are disposed on opposite sides of the frame so that the description of one of the cam systems will suffice for both.

Vertical movement of the cam 39 is controlled by the operating handle 18 which consists of a U-shaped member, as best illustrated in Figure 1, having a cross brace 41 extending between its opposed legs. The handle 18 is pivoted to the cams at a pivot pin 42 and at the end of the legs there is provided a pivot pin 43 connecting the operating handle 18 to a link 44. The latter is pivotally secured by means of a pin 46 to a stationary part of the frame assembly. Accordingly, lifting of the handle 18 serves to move the link 44 inwardly, as indicated in Figure 4, and permits straight up and down motion of the cam 39 in the guideway provided by the guides 36 and 37.

Cam 39 includes a camming member 48 whose shape is best illustrated in Figures 4 and 5 of the drawings. As best seen in Figures 3 and 4, the camming member 48 is secured behind the shank 38, so that in its elevated position, it may be received behind the guides 36 and 37. The lower end of the camming member 48 has an angularly disposed surface 48*a* which is at a substantial angle to the vertical axis of the cam. A second camming surface 48*b* is more nearly vertical with respect to the vertical axis of the cam. A third camming surface 49*c* is practically parallel to the vertical axis, while the fourth camming surface 48*d* is inclined upwardly and inwardly toward the shank 38 of the cam 39.

The cams 39 cooperate with a plurality of double bell crank lever assemblies in applying pressure, and in locking the platen in pressure applying relationship to the assembly to be bonded. The stationary pivots for the bell crank lever assemblies are provided by means of a pin 51 secured to a roller 52 on one side of the cam assembly, and a pin 53 secured to a roller 54 on the opposite sides of each of the cam assemblies.

One arm 56 is pivotally connected to an arm 57 of a second bell crank lever through a pivot pin 58. Correspondingly, an arm 59 on the opposite side of the cam assembly is connected to an arm 61 of a second bell crank lever assembly through a pivot pin 62. The arms 57 and 61, respectively, receive shafts 64 and 66 respectively on which a pair of opposed rollers 67 and 68 are rotatably mounted. As indicated best in Figure 4 of the drawings, when the cam is in the raised position, the rollers 67 and 68 engage the first camming surfaces 48*a* on the camming member and are substantially in abutting relation.

Opposed arms 69 and 71 carry rollers 72 and 73 by means of shafts 74 and 76 respectively, the rollers 72 and 73 being out of contact with the cam 48 when the cam is in the elevated or disengaged position.

The movement of the roller assemblies, in response to the movement of the camming member 48, is translated into movement of the platen assembly by the opposed arms 78 and 79 which are secured by means of pivot pins 81 and 82 respectively to the upper plate 35 of the platen assembly. The shroud 31 is relieved as indicated at 31*a* and 31*b* to accommodate the movement of the arms 78 and 79 in pivoting about their respective pivot points.

The pivot pins 81 and 82 (and the corresponding pivot pins on the other side of the press assembly) are in spaced relation about the platen so that the platen is pulled down equally on all sides, delivering a uniform pressure on the structures to be bonded, regardless of the size of the structure or its position under the platen.

The showing in Figure 4 of the drawings depicts the condition of the elements when the platen is in its raised position, arranged to receive the combination of the printing plate 24, the film 29, and the base 26 on the supporting table 14. When the elements to be bonded are placed on the supporting table beneath the platen 17, the operating handle 18 is moved downwardly causing the cams 48 to be received in wedged engagement between the opposed rollers 67 and 68. As long as the rollers 67 and 68 ride on the first camming surface 48*a* there is little resistance presented to the downward movement of the platen 17. At the time the rollers 67 and 68 engage the second camming surface 48*b*, however, the clearance between the pressure surface 32 and the assembly to be bonded has been taken up and pressure will be applied against the face of the printing plate 24. Continued movement of the camming member 48 downwardly causes the rollers 67 and 68 to spread further apart, thereby exerting a greater pull on the arms 78 and 79 by the pivoting of the bell crank lever assemblies about their axes.

As the rollers 67 and 68 move upwardly along the second camming surfaces 48*b*, the rollers 67 and 68 diverge to a greater extent, while the upper rollers 72 and 73 approach the cam 39 from opposite sides. The cam 39 continues to move downwardly until the bell crank lever assemblies assume an over the center position in which the platen 17 is locked against the assembly to be bonded. As will be seen from an inspection of Figure 5, the axes of the pin 81 and the pin 51 are in the same vertical plane. The same is true of the axes of the pin 82 and the pin 53. Accordingly, as the rollers 67 and 68 ride up on the third camming surface 46*c*, the axis of the pin 58 is shifted to the left of the vertical plane containing the axes of the pins 81 and 51 by a slight amount, causing the rollers 72 and 73 to tightly engage the cam 39 along the camming surface 48*d*. A stop 91 is provided to limit the pivotal movement of the bell crank lever assembly to a position just slightly off center with respect to the aforementioned vertical plane. Similarly, a stop 92 limits the movement of the bell crank lever assembly on the opposite side of the cam to a slightly over center position where the roller 73 is wedged against the camming surface 48*d*.

The platen 17 is kept in the pressure applying position for a sufficient time to secure the desired bonding between the film 29, the base 26, and the printing plate 24. For the usual type of bonding films, a pressure application of about three minutes at a temperature of about 300° F. will be sufficient to secure the bonding action.

To release the platen 17 from the pressure applying position, the operating handle 18 is moved upwardly, causing the assembly to unlock and shift the rollers 72 and 73 away from the cam 39. The rollers 67 and 68 then ride downwardly on the camming surface 48*b* and finally on the camming surface 48*a* until a clearance is provided between the pressure plate 32 and the bonded assembly. The assembly may then be removed from the press by pulling on the handles 16.

The assembly described provides a press in which pressure can be applied uniformly along a relatively wide area independently of the size and the location of the articles being bonded. The self-locking feature also guarantees that only a predetermined pressure will be applied to the articles being bonded to assure uniformity of the bonding process.

It will be evident that various modifications can be made to the described embodiments without departing from the scope of the present invention.

I claim as my invention:

1. A press assembly comprising a frame, a support table disposed on said frame, a platen mounted above said table and movable into pressure applying relationship with respect to said table, a wedge type cam carried by said platen, an operating handle pivotally secured to both said frame and said platen for raising and lowering said platen with respect to said table, means on said platen confining the movement of said cam into a substantially vertical path, a pair of opposed bell crank levers pivotally supported on said frame, means pivotally securing one end of an arm of each of said bell crank levers to spaced points on said platen, and roller means on the other end of each of said arms engaging said cam in closely spaced opposed relation whereby movement of said cam is effective to spread said roller means apart and to pivot said bell crank levers about their respective pivotal axes to thereby move said platen into pressure applying relationship, said bell crank levers being pivotable by continued movement of said cam into an over center position in which said platen is locked in pressure applying relation.

2. The assembly of claim 1 in which said cam has a first camming surface at a substantial angle to the vertical axis of said cam, and a second camming surface at a smaller angle to said vertical axis than said first camming surface.

3. A press assembly comprising a frame, a support table disposed on said frame, a platen movable into pressure applying relationship with respect to said table, spaced resilient means normally urging said platen into spaced relation with said frame, a wedge type cam movable with said platen, an operating handle pivotally secured to both said frame and said platen for raising and lowering said platen with respect to said table, means on said platen confining the movement of said cam into a substantially vertical path, a pair of opposed bell crank levers pivotally supported on said frame, means pivotally securing one end of an arm of each of said bell crank levers to spaced points on said platen, and a pair of spaced rollers on the other end of each of said arms arranged to engage opposite sides of said cam, said cam having angularly inclined surfaces sequentially appearing between said pairs of spaced rollers and including inwardly inclined surfaces engageable by one of each of said pair of rollers, whereby movement of said cam is effective to pivot said bell crank levers about their respective pivotal axes, said bell crank levers being pivotable into an over center position in which said rollers engage said inwardly inclined surfaces to lock said platen in pressure applying relation.

References Cited in the file of this patent

UNITED STATES PATENTS

| | | |
|---|---|---|
| 1,533,115 | Hulbert | Apr. 14, 1925 |
| 2,138,620 | Strange | Nov. 29, 1938 |

FOREIGN PATENTS

| | | |
|---|---|---|
| 615,857 | Germany | July 13, 1935 |
| 736,708 | Germany | June 26, 1943 |
| 737,390 | Germany | July 12, 1943 |